May 14, 1963 K. PALMER 3,090,007
FILAR SUSPENDED INSTRUMENT MOVEMENT
Filed April 14, 1961 4 Sheets-Sheet 1

Fig. 1.

INVENTOR
Karl Palmer.
BY John L. Stoughton
ATTORNEY

May 14, 1963  K. PALMER  3,090,007
FILAR SUSPENDED INSTRUMENT MOVEMENT
Filed April 14, 1961  4 Sheets-Sheet 2

May 14, 1963 K. PALMER 3,090,007
FILAR SUSPENDED INSTRUMENT MOVEMENT
Filed April 14, 1961 4 Sheets-Sheet 4

3,090,007
FILAR SUSPENDED INSTRUMENT MOVEMENT
Karl Palmer, West Orange, N.J., assignor to Westinghouse Electric Corporation, East Pittsburgh, Pa., a corporation of Pennsylvania
Filed Apr. 14, 1961, Ser. No. 102,996
10 Claims. (Cl. 324—154)

This invention relates to instrument mechanisms and has particular relationship to instrument mechanisms including an element which is mounted for movement about an axis relative to a stator structure.

In the past, instrument mechanisms have included a moving element which is movable relative to a stator structure. Various arrangements have previously been employed for mounting the movable element for movement. As an example, an arrangement has previously been utilized for mounting the element wherein pivot bearings are carried by the element to engage cooperating fixed bearings which are mounted by the stator structure. This arrangement has resulted in considerable friction between the bearing parts necessitating frequent replacement of the bearings.

In the present invention an instrument mechanism is provided including a moving element with improved means for mounting the element for rotation about an axis relative to a stator structure. According to the invention the improved mounting means includes a pair of torsionally resilient threads aligned along an axis with each thread secured in a taut condition between a separate supporting member and the moving element to suspend the element for substantially frictionless rotation about the axis defined by the threads. In the present invention at least one of the supporting members is of resilient, U-shaped formation including a portion to which one of the threads is secured which is deflectable in directions parallel to the axis.

The invention further provides that the resilient member includes a curved grooved surface generated about an axis transverse to the axis of rotation. The thread is mounted to extend in engagement with the groove which is effective to properly locate the thread and to minimize the possibility of damage thereto.

The invention also provides improved mounting means carried by the moving element to secure the thread to the moving element. The mounting means may include a hollow tower part carried by the moving element and a terminal clip attached to the hollow part to which the associated thread is secured.

When the invention is employed in connection with moving coil electrical instruments, the threads may be arranged to conduct electrical current to supply energization to the moving coil. For this purpose the resilient members as well as the threads, are formed of electroconductive material. The invention further provides that the terminal clips are formed of electroconductive material including spaced tail portions to which are respectively attached the associated thread and an associated terminal of the wire of the moving coil. These clips also have curved grooved surfaces in the manner of the associated resilient members for properly and safely mounting the threads.

One of the resilient members is preferably mounted for rotation about the axis of the threads to permit adjustment of the moving coil about the axis to permit calibration of the instrument. An arrangement is also provided for limiting displacement of the supporting resilient members in directions parallel to and transverse to the axis of rotation. This arrangement is effective to minimize the possibility of breakage of the suspension threads when the instrument is subjected to high shock conditions.

In a preferred embodiment of the invention an electrical instrument is provided having a stator structure and a rotor structure including a moving element which is mounted for rotation relative to the stator structure. The arrangement is such that the moving element may be rotated about the axis through an angle in excess of 180°, preferably an angle of the order of 270°.

In order to mount the element for rotation relative to the stator structure, the invention provides that one, and preferably both, of the supporting members comprises a U-shaped strip of spring material with the springs located beyond opposing ends of the element. Each of the springs has a pair of spaced legs at one side of the axis connected by a base on the opposite side of the axis. The legs of each of the springs are spaced in the direction of extension of the axis. The leg of each spring which is adjacent to the element is fixed to the stator structure whereas the more remote legs of the springs are free for displacement in directions extending parallel to the axis.

Each of the free spring legs includes a projection which extends in a direction opposite to the associated free leg towards the axis of rotation. In the present invention this projection terminates in a curved grooved surface generated about an axis transverse to the axis of rotation of the element with the axis of rotation tangent to such surface.

A pair of hollow towers of stepped formation are mounted by the moving element at each end thereof in spaced relation with the adjacent spring member. An electroconductive terminal clip having a circular body is secured to a circular seat within the hollow of the tower. This clip includes an extension which projects from the body into an opening of the body, and which terminates in a curved grooved surface in the manner of the projection of the resilient member.

In order to mount the element, a pair of torsionally resilient flat thin electroconductive ribbons are each secured between a separate one of the terminal clips and the free leg of a separate one of the springs to extend along the axis of element rotation through the hollows of the towers in engagement with the grooves of the associated curved surfaces.

The instrument may include an indicating pointer which is conveniently secured to the support towers to extend along an axis included in a plane which also includes the moving element. In order to permit adjustment of the pointer about the axis of rotation of the element to permit calibration of the instrument, one of the resilient springs is mounted for rotation about the axis.

It is therefore an object of the invention to provide an instrument mechanism having an element movable relative to a stator structure with improved means for mounting the element for movement with respect to the stator structure.

It is another object of the invention to provide an electrical instrument having an element movable with respect to a stator structure with an improved element mounting arrangement including a torsionally resilient thread secured between the moving element and a resilient means of one piece construction to extend along the axis of rotation of the element in a taut condition.

It is a further object of the invention to provide an instrument as defined in the preceding paragraph with improved means for securing the thread to minimize the possibility of breakage of the thread.

It is still another object of the invention to provide an instrument as defined in the next preceding paragraph including an electroconductive terminal clip carried by the element to both aid in mounting the thread and electrically connect the thread to the moving element.

Other objects of the invention will be apparent from the following description taken in conjunction with the accompanying drawings, in which.

Figure 1:
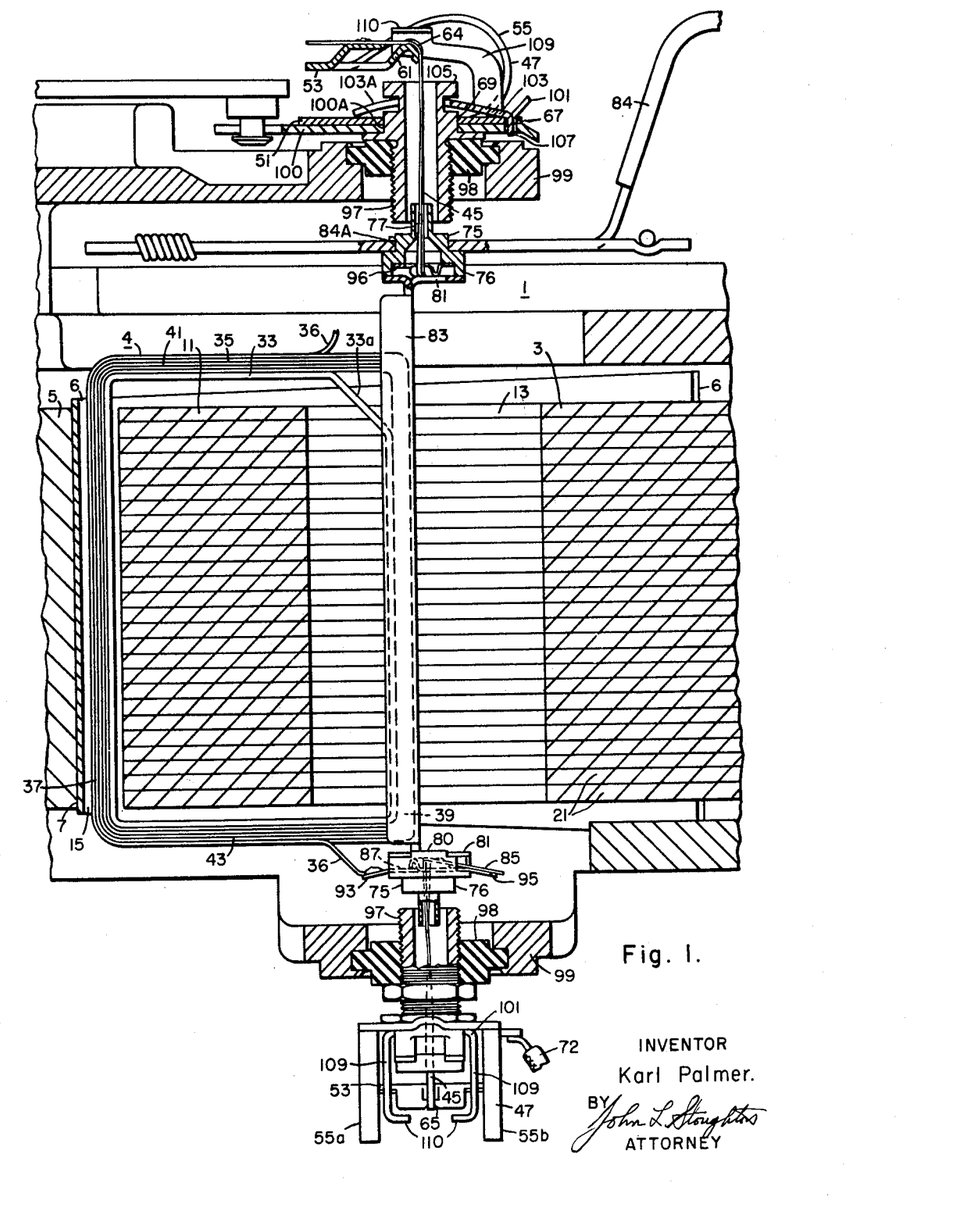
FIGURE 1 is a view in elevation with parts broken away and with parts shown in section of an instrument mechanism embodying the teachings of the present invention with a rotor unit in a mid-scale position.
Figure 2:
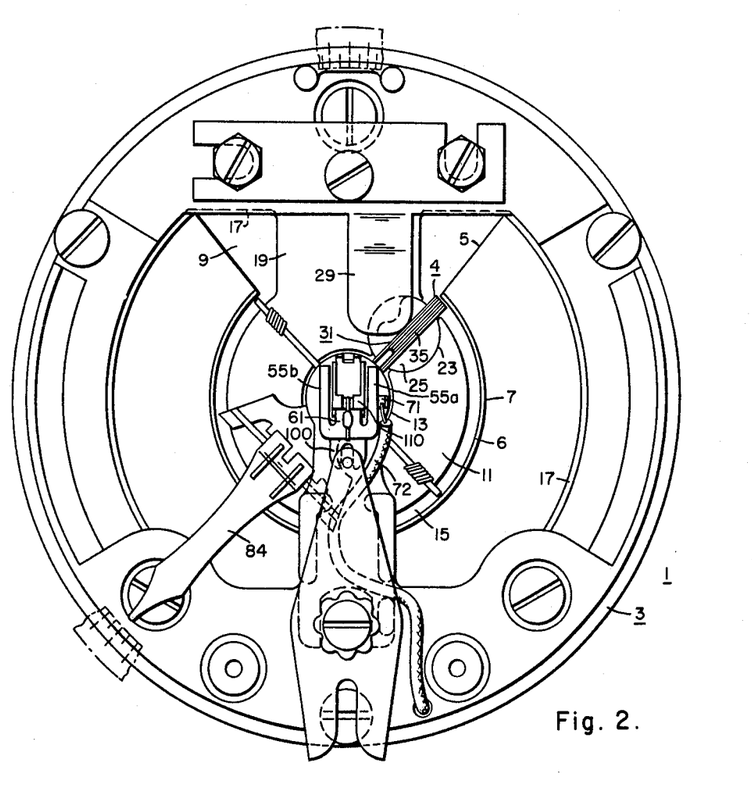
FIG. 2 is a view in top plan of the instrument of FIG. 1 with parts broken away and with parts shown in section but with the rotor unit in an end-scale position.

Referring to the drawings there is illustrated in FIGS. 1 and 2 an instrument mechanism represented generally by the numeral 1 embodying the teachings of the present invention. The instrument 1 may assume various forms and is illustrated in the form of an electrical instrument of the moving coil type including a stator structure 3 and a rotor structure 4 including a moving coil which is mounted for rotation with respect to the structure 3. The rotor structure or rotor unit 4 is shown in FIG. 1 at a mid-scale position wherein it occupies a median position in its range of rotation. (The rotor structure 4 is shown in its rest or zero position in FIG. 2 which corresponds to a left zero instrument wherein the pointer reads zero in the position shown.) The invention is also applicable to other types of electrical instruments such as moving iron instruments.

The stator structure 3 includes a magnetic structure consisting of a permanent magnet 5 formed of any suitable permanent magnetic material. For example, the magnet 5 may be constructed of an aluminum, nickel, cobalt alloy known as Alnico. The magnet 5 may be formed in any suitable manner and is illustrated as having an annular configuration with a central opening 7. The magnet is preferably of C-shaped formation having an open side 9 as shown in FIG. 2. The magnet 5 is provided with an inner pole piece 6.

The magnetic structure further includes a magnetic core 11 of annular configuration including a central opening 13. The core 11 is positioned within the opening 7 of the magnet 5 in concentric spaced relation therewith to define an air gap 15. A suitable magnetic return ring 17 of annular configuration surrounds the permanent magnet 5 in engagement therewith.

The core 11 and the ring 17 provide paths for magnetic flux produced by the magnet 5 which is magnetized radially of the axis of the magnet. The core 11 and ring 17 may be formed of any suitable magnetic material such as silicon steel and are preferably integrally connected by a neck 19 which extends between portions of the core 11 and ring 17 through the open side 9 of the magnet. The core and ring are preferably constructed of a plurality of laminations 21 which are stacked in a direction extending transverse to the plane of the paper.

The rim of the core 11 may include an opening 23 extending entirely therethrough to permit assembly and disassembly of the rotor structure with respect to the core. This opening may be filled with a magnetic plug 25 subsequent to the assembly of the rotor structure in its operative position. Details of a suitable plug arrangement may be found in L. J. Lunas application Serial No. 664,759 filed June 10, 1957, now U.S. Patent 2,959,736 dated November 8, 1960. A suitable frame 27 may be provided to mount the stator and rotor structures in operative positions. The frame may include a pair of spaced projections 29, only one of which is illustrated in FIG. 2, which serve to prevent accidental displacement of the plug 25 from the opening 23.

The rotor structure 4 of the instrument includes a moving element shown in the form of a coil represented generally by the numeral 31 which is mounted for rotation about an axis with respect to the stator structure 3. As best shown in FIG. 1, the coil 31 includes a damping ring 33 which is generally of rectangular configuration and which is preferably formed of a suitable electroconductive material such as aluminum. The ring 33 serves to damp movement of the coil 31 when the coil is rotated with respect to the magnetic structure.

The coil 31 further includes a plurality of turns of electroconductive wire 35 which surround the ring 33. The wire 35 includes spaced terminals 36 to be connected for energization in accordance with an electrical current to cause movement of the coil.

As illustrated in FIG. 1, the ring 33 includes a portion 33a which is spaced from the wire 35 to extend angularly across a corner of the coil 31. This spacing is sufficient to permit severance of the portion 33a by a suitable tool for adjusting the damping supplied by the ring 33. This arrangement permits the employment of common parts in the instrument when the instrument is utilized as either an ammeter or a voltmeter. When the instrument is utilized as an ammeter with a shunt, the damping supplied by the ring is normally not necessary. However, when the instrument is employed as a voltmeter, it is usually desirable that the damping be supplied by the ring 33. Consequently, for ammeter applications the portion 33a may be severed to render the ring 33 ineffective for supplying a damping effect.

As shown in FIG. 1, the coil includes a pair of spaced parallel sides 37 and 39 connected by spaced end portions 41 and 43 to provide the rectangular configuration. The coil 31 is mounted such that the side 37 is positioned within the air gap 15 to extend through the air gap in a direction transverse to the length dimension of the air gap. The side 39 is located in the opening 13 of the magnetic core 11.

In the past a number of arrangements have been employed for mounting a moving element for rotation relative to an associated stator structure. For example, it has previously been the practice to utilize pivots formed of metallic material such as steel which are carried by the moving element in rotating engagement with cooperating fixed bearings supported by the stator structure. This arrangement has been disadvantageous in that the relative rotation between the pivots and fixed bearings has created friction which has adversely affected the operation of the instrument. Furthermore, such friction has caused considerable wear of the bearings necessitating the frequent replacement thereof.

According to the present invention an improved arrangement is provided for mounting a moving element for rotation with respect to a stator structure. In the present invention a suspension system is utilized for supporting the moving element whereby the employment of conventional relatively rotatable bearings is eliminated. An instrument constructed in accordance with the invention has exhibited extremely high sensitivities and has proved to be of sturdy construction capable of withstanding high shock conditions.

Referring to FIG. 1 the improved mounting arrangement is illustrated as including a pair of filamentary elements or torsionally resilient threads. Although filamentary elements or threads of round or non-circular cross-section may be employed they are preferably in the form of flat thin bands or ribbons. In the particular embodiment illustrated the ribbons are preferably formed of a suitable electroconductive material, and are secured in taut conditions between the coil and a pair of supporting spring members. The ribbons are denoted by the numeral 45 and are preferably formed of a material consisting of an alloy of platinum and nickel. Excellent results have been obtained by utilizing an alloy formed of 91% platinum and 9% nickel. However, other alloys may be employed for the ribbons such as an alloy of platinum and iridium and also beryllium copper.

In a particular application of the invention ribbons of approximately .4 inch in length from rotor to fulcrum, .0055 inch in width and .0005 inch in thickness have been utilized with excellent results.

The ribbons 45 are designed to be supported in taut conditions in alignment along an axis so that the coil may be suspended without substantial displacement in directions extending transverse to the axis defined by the ribbons. For example, it has been observed that when the ribbons are tensioned to between approximately 40% and 50% of their tensile strength, the instrument may be mounted for operation with the axis of the ribbons extending horizontally without appreciable displacement of the moving coil in vertical directions.

In a particular application of the invention a ribbon tautness to rotor weight ratio of approximately one hundred has been successfully employed. The entire rotor structure is formed of a light weight material, preferably aluminum, and weighs of the order of .9 gram which gives a ribbon tautness of approximately 90 grams.

In order to secure the ribbons 45, the invention provides a pair of supporting members 47 at least one of which is formed of a spring material. Each of the members 47 is preferably formed from strip stock spring material which is non-magnetic and electroconductive. Preferably the material employed for the members 47 is beryllium copper. The members 47 may be of identical construction and are initially formed to have the configuration illustrated in developed form in FIG. 3. Inasmuch as the members 47 are of identical construction, only one of the members will be described.

Figure 3:
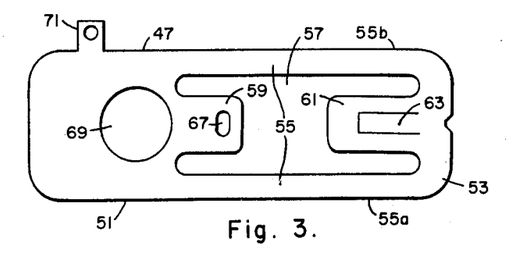
FIG. 3 is a view in top plan of a part of the instrument of FIGS. 1 and 2.

As shown in FIG. 3, the member 47 includes a pair of spaced end portions 51 and 53 which constitute spaced legs when the member 47 is deformed into a U-shaped configuration as illustrated in FIG. 1. The spaced legs are connected by a base section 55 consisting of spaced side portions 55a and 55b of the strip which are spaced by a slot 57 of the strip. The slot 57 is of substantially H-shaped configuration to provide a pair of spaced projections 59 and 61 which extend towards each other as shown in FIG. 3 and the pair of spaced side portions 55a and 55b connecting the end portions. The projection 61 includes a portion 63 which is struck out therefrom and to which an end of the associated ribbon 45 is secured by soldering. The entire structure of FIG. 3 preferably is punched or cut from a single strip of beryllium copper. An alloy is employed which has sufficient beryllium for hardening purposes. An alloy containing 1.8 to 2.05% beryllium by weight is suitable, the remainder being copper.

It is observed that the projection 59 includes a small opening 67 which is spaced from a larger opening 69. A projection 71 extends from a side edge of the member 47 to permit securement of input conductors 72 of the instrument to the members 47. One input conductor is shown in FIG. 1 secured to the lower member 47. The other input conductor may be similarly secured to the upper member 47.

Figures 4, 7, 8, 9, 10:
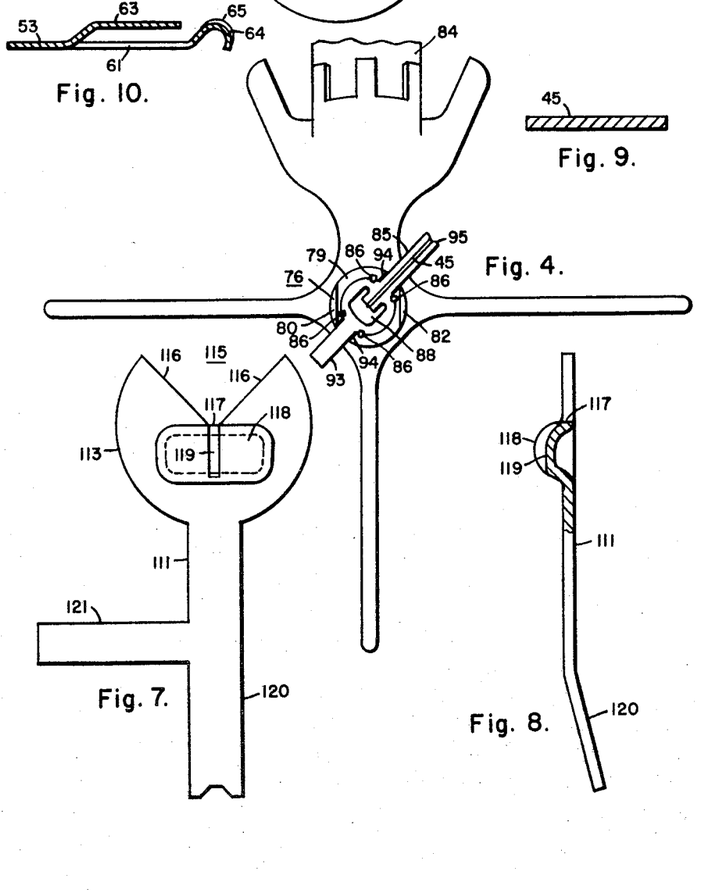
FIG. 4 is a view in bottom plan of a portion of the instrument of FIGS. 1 and 2.
FIG. 7 is a view similar to FIG. 5 showing a different construction of the part of FIG. 5.
FIG. 8 is a view in section of the part shown in FIG. 7.
FIG. 9 is a view in section of the suspension ribbon employed in the instrument of FIG. 1.
FIG. 10 is a view in section of the resilient member employed in the instrument of FIG. 1.

As best shown in FIGS. 1 and 10, the projection 61 is formed with a curved terminal surface 64 having a groove 65 to provide a fulcrum with which the associated ribbon is in engagement to properly locate the ribbon and to minimize the possibility of breakage of the ribbon.

When the member 47 is in its operative position the surface 64 is generated about an axis which extends transverse to the axis of the ribbons. The groove 65 provides spaced ribs of the surface 64 between which the ribbon passes to confine the ribbon to the surface portion between the ribs.

As illustrated in FIG. 1 the strips 47 are deformed from the strip condition illustrated in FIG. 3 to a U-shaped configuration by bending the strip upon itself. Each of the members 47 is positioned with its legs 51 and 53 spaced in the direction of extension of the axis of coil rotation on one side of the axis to have the base section 55 located on the other side of the axis. The projection 61 extends toward the axis with the axis tangent to the surface 64 of the associated curved section. Provision of the fulcrums on the projections 61 serves to increase the flexibility of the members 47. As illustrated in FIG. 1 the legs 51 of the members 47 are secured to portions of the stator structure 3 with the legs 53 free for displacement relative to the stator structure in directions parallel to the axis. The manner of securing the legs 51 to the stator structure will be described hereinafter.

It is desirable that the softness deflection gradient of the members 47 be large for the required loading of the members 47 so that the possibility of damage to the ribbon under shock is minimized. The thickness of the stock from which the members 47 are formed is preferably selected so that any loading between 40 and 200 grams will cause a deflection of approximately .33 inch of the legs 53 from their non-deflected condition.

Each of the members 47 in effect provides a double cantilever swing with the cantilever extending in opposite directions. Thus the side portions 55a and 55b define a first cantilever spring extending across the axis of rotation in operating position. The projection 61 constitutes a second cantilever spring extending from the free end of the first cantilever spring towards the axis of rotation when in operating position. This construction provides a long spring in a small space and permits a long spring deflection without appreciable radial deviation of the rotor unit from its correct position relative to the axis of rotation.

In the present invention a pair of support means 75 cooperate with the members 47 to mount the ribbons 45 in taut conditions. The means 75 are carried by the coil 31 in any suitable manner for rotation therewith. As shown in FIGS. 1 and 4 the support means 75 each is of identical two-part construction including a tower part 76 of cylindrical stepped formation having a central opening 77 extending therethrough through which the associated ribbon extends when in a secured condition. Preferably, the towers are of an electrical insulating construction. For example, the towers may be formed of aluminum with a coating of a suitable insulating material applied thereto, which may be similar to the coating shown in the McCulloch Patent No. 1,751,213, issued March 18, 1930. The towers 76 include channels 79 defining legs 80 and 82 between which are received projections 81 of a coil support 83 having a channel in which is located the side 39 of the coil. The support 83 is preferably of an insulating construction, and may be formed of aluminum with an insulating coating such as the aforesaid McCulloch coating.

Figure 5:
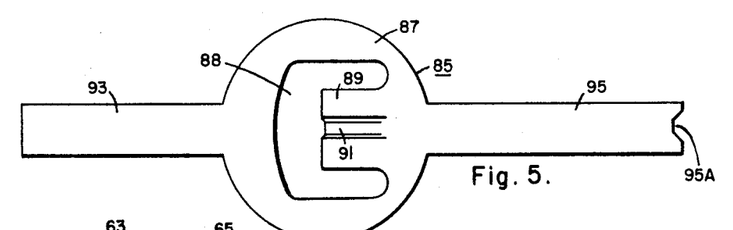
FIG. 5 is a view in top plan of a part of the portion illustrated in FIG. 4.
Figure 6:
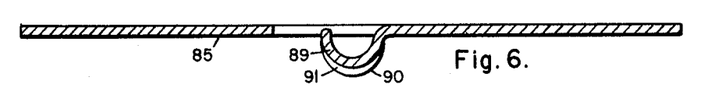
FIG. 6 is a view in section of the part shown in FIG. 5.

In the present invention each of the support means 75 includes further a terminal member 85 which is secured to the tower within an enlarged portion of the opening 77 as by a staking operation at four staking points 86. As best shown in FIGS. 4, 5 and 6 the terminal 85 includes a circular body part 87 having an opening 88 with a curved section 89 projecting from the wall of the opening toward the center thereof. This curved section includes a grooved curved surface 90 located such that the axis of coil rotation is tangent thereto. As shown in FIG. 1, the surface of 90 is generated about an axis transverse to the axis of coil rotation. The associated ribbon engages the groove 91 of the curved section 89 and extends transversely from the axis of coil rotation into engagement with a tail portion 95 of the terminal to be secured thereto. The terminal 85 includes an opposing tail portion 93 to which the terminal 36 of the wire 35 may be secured. The terminal 85 may be constructed of any suitable electroconductive material.

As shown in FIGS. 1 and 4 each of the towers 76 includes a recessed circular seat 96 within the hollow of the tower. The members 85 are located relative to the associated towers with the body parts 87 in snug engagement with the seats 96. The towers 76 each further includes a pair of diametrically opposed slots 94 which communicate with the hollows thereof. Each of these slots is proportioned to receive a separate one of the tail portions 93 and 95 which extend through the slots to areas spaced from the towers. A notch 95A at the end of the tail portion 95 facilitates positioning of the end of the associated ribbon along the tail portion.

The terminal member 85 may be punched from a sheet of material which is softer than the ribbon positioned thereby such as soft jeweler's brass. The material then may be bent or deformed to define the grooved curved surface. The side walls of the groove are preferably spaced by a distance slightly smaller than the width of the ribbon which cuts its own seat in the soft brass.

The instrument may include a suitable indicating pointer 84 which is preferably mounted to extend along an axis which is included in a plane which also includes the coil 31 as illustrated in FIG. 2. The pointer 84 is conveniently supported by one of the support means 75. As illustrated in FIG. 1, the pointer has a circular opening 84A for snugly receiving a circular part of the upper tower to which it is secured as by a staking operation.

As illustrated in FIG. 1, the members 47 are preferably mounted such that the legs of one member extend in directions transverse to the direction of extension of the legs of the other member. One of the members 47 is preferably mounted for adjustment about the axis defined by the ribbons 45. Such arrangement permits adjustment of the coil 31 and consequently, the pointer 84 about the axis of rotation of the coil to allow calibration of the instrument. For example, the pointer 84 may be adjusted with respect to an associated scale (not shown) to indicate a zero reading when the instrument is deenergized. The pointer 84 is illustrated in FIG. 2 in its zero indicating position.

For this purpose a pair of hollow screw members 97 may be provided which are in threaded engagement with insulating bushings 98 carried by portions 99 of the stator structure. As shown in FIG. 1 the screw members are located in concentric relations with the axis of the ribbons 45 such that the ribbons extend through the openings of the screws when the ribbons are in a secured condition. In order to permit adjustment of the pointer 84 a suitable adjuster 100 is provided having a circular opening 100A through which a circular part of the screw 97 extends snugly. The adjuster 100 is illustrated in FIG. 1 in association with the upper screw 97 such that adjustment of the adjuster about the axis causes a similar adjustment of the member 47 about the axis.

A suitable spring clip 101 is provided which includes a forked base portion 103 having tines 103A (one shown in FIG. 1) located between the headed portion 105 of the screw and the leg 51 of the member 47. The screw 97 extends through the opening 69 of the member 47. The base portion 103 is of resilient construction and biases the leg 51 against the adjuster 100. It is noted that the clip 101 includes a projection 107 which extends through the opening 67 of the leg 51 and an aligned opening of the adjuster 100 such that the adjuster 100, the member 47 and the clip 101 may be rotated about the axis as a unit.

It is desirable that displacement of the free ends 53 of the members 47 be limited in directions parallel and transverse to the axis of the ribbons. For this purpose stop means may be provided for so limiting the displacement of the free legs so as to minimize the possibility of breakage of the ribbons when the instrument is subjected to shock conditions. The stop means preferably includes a pair of spaced wings 109 which project from the base portions 103 of the clips 101. These wings include transverse extensions 110 positioned adjacent the curved sections of the projections 61 to engage these sections when the legs 53 are displaced axially by a short amount. The wings 109 are located to limit displacement of the legs 53 in directions transverse to the axis. It is noted that the towers 76 are also effective to limit movement of the legs 53 in directions parallel to the axis by engaging the ends of the screws 97 opposite from the headed ends in response to limited axial movement of the coil.

It will be understood that each of the ribbons, for example the upper ribbon 45 in FIG. 1, extends between the associated members 47 and 85. The upper end of the ribbon bends smoothly over the curved surface 64 between the walls forming the groove 65 and is secured to the portion 63 in a suitable manner, as by soldering.

In an analogous manner the lower end of the upper ribbon 45 bends smoothly over the curved surface 90 between the walls forming the groove and is secured to the tail portion 95 as by soldering.

It will be recalled that electrical connections are made to the projection 71 of the member 47 and the tail portion 93 of the member 85. Because of the integral constructions of the members 47 and 85, constant resistance is presented by the ribbon across the projection 71 and the tail portion 93. Furthermore by punching the members 47 and 85 complete from sheet or strip material and thereafter deforming the punched parts to form the finished members, the ribbon can be accurately and permanently located.

Other constructions may be employed in place of the member 85. Referring to FIGS. 7 and 8 there is illustrated a terminal member 111 which is of different configuration than the member 85 illustrated in FIGS. 5 and 6. The configuration of the member 111 differs from that of the member 85 in that the member 111 includes a circular part 113 having a sector removed to provide a V-shaped notch 115 having sides 116 joined by a base 117. The part 113 includes a curved surface 118 having a groove 119 with the surface 118 generated about an axis transverse to the axis of the coil when the member 111 is operatively positioned. The groove 119 terminates in the base 117 with which the axis of coil rotation is tangent when the member 111 is in an operating position.

The member 111 includes further spaced extensions 120 and 121 to which the associated ribbon and a terminal of the coil wire may be respectively secured. The member 111 may be mounted by a tower 76 in the manner of the member 85. The associated ribbon is secured to the projection 120 to extend over the surface 118 in engagement with the groove 119 along the axis of coil rotation.

When the input conductors 72 are energized current flow may be traced as follows assuming a positive polarity for the input terminal of the conductor 72 shown in FIG. 1. With this assumption current flows from the conductor 72 through the lower member 47 as viewed in FIG. 1, the lower ribbon 45, the lower member 85, the lower terminal 36, the wire 35, the upper terminal 36, the upper member 85, the upper ribbon 45, the upper member 47 and the upper conductor 72 (not shown).

In the present invention an instrument mechanism has been provided with exhibits vastly improved operating characteristics as compared to previous constructions. The improved coil mounting arrangement provides an instrument having a very high sensitivity. For example, it has been observed that the coil 31 may be moved from its zero position to its full scale position over an angle of approximately 270° in response to an energization of the coil by approximately 50 microamperes.

Furthermore, the invention eliminates the necessity of providing conventional relatively rotatable bearings which produce considerable friction and require frequent replacement. The improved suspension arrangement permits the mounting of the instrument such that the axis of rotation of the coil is either extending in a horizontal or vertical direction as desired.

Figure 11:
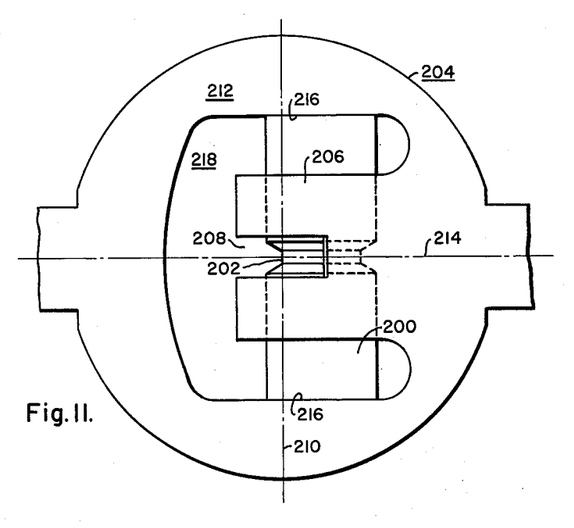
FIG. 11 is a top plan view of a modified form of the part shown in FIG. 5.
Figure 12:
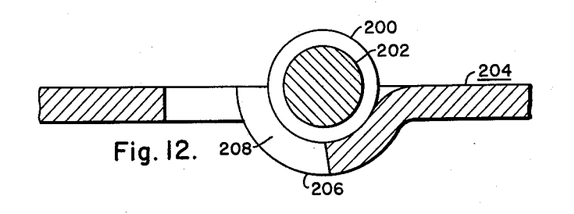
FIG. 12 is a sectional view of the part shown in FIG. 11.
Figure 13:
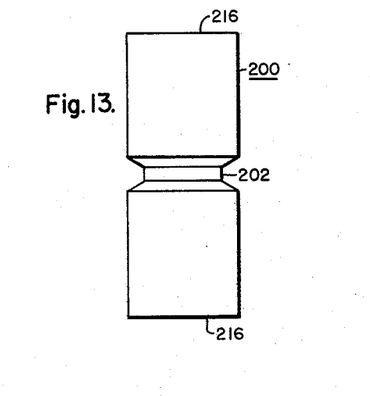
FIG. 13 is a view of the centering pin of FIGS. 11 and 12.

In some instances, as for example, when very narrow ribbons, as for example .003 inch or less, are used to support the movable coil it is desirable to provide a centering pin 200 provided with a groove 202 in which the ribbon 45 may seat. Such a construction is illustrated in FIGS. 11, 12 and 13. The centering pin 200 may conveniently be made in a screw machine and is provided with a peripheral groove 202 having a flat bottom of the same or slightly less width as the width of the ribbon 45 which seats thereagainst. For example, the bottom width of the groove 202 for a ribbon of .003 inch may be .0028 inch to provide for a slight wedging engagement to insure a fixed relationship between the pin 200 and the ribbon.

The pin 200 is carried by a bifurcated portion 206 of a terminal member 204 similar to the terminal member 85 except that the central portion of the curved section 206, corresponding to section 89 of the member 85, has been cut away to provide an opening 208. The curved section 206 cradles the pin 200 and supports the pin so that the bottom of its groove 202 is tangent to the lateral centerline 210 of the circular body part 212 of the member 204. In order that the bottom wall of the groove 202 is centered with respect to the longitudinal centerline 214, the length of the pin 200 is made equal to the distance between the diametrically spaced walls 216 of the opening 218. It will be appreciated that with this construction, the ribbon 45 seats accurately in the bottom of the groove 202 and leaves the pin in a tangential manner to minimize the friction between the ribbon 45 and pin 200 during rotation of the coil.

This application is a continuation-in-part of my copending application Serial No. 761,898 filed September 18, 1958, for Instrument Mechanisms, now forfeited. Certain subject matter disclosed herein is disclosed in copending application of Veron S. Thomander Serial No. 761,899, filed September 18, 1958, for Instrument Mechanisms and assigned to the same assignee.

Although the invention has been described with reference to certain specific embodiments thereof, numerous modifications are possible, and it is desired to cover all modifications falling within the scope of the present invention.

I claim as my invention:

1. In an instrument mechanism having a suspension mounting, a stator structure, a moving element, and mounting means mounting said element for rotation about a first axis relative to the stator structure, said mounting means comprising a homogeneous support strip formed of resilient ribbon material, said support strip including a first end piece disposed in a plane transverse to the first axis and secured to the stator structure, a second end piece spaced from the first end piece and radially spaced from the first axis, first and second side pieces disposed on opposite sides of the first axis and integrally secured to the end pieces, said side pieces being bent about a second axis transverse to the first axis, and being spaced in the direction of such second axis, said end pieces and side pieces in developed form constituting substantially a hollow rectangle, a projection extending integrally from the second end piece between and spaced from the side pieces towards the first axis, the free end of said projection terminating in a curved surface arcuate about a third axis transverse to the first axis and spaced in the direction of the first axis from the moving element, said first axis being substantially tangent to the curved surface, and a suspension thread having a first end secured to the moving element and a second end secured to the stator structure, said suspension thread extending along said first axis and over said curved surface in taut condition.

2. In an instrument mechanism having a suspension mounting, a stator structure, a moving element, and mounting means mounting said element for rotation about a first axis relative to the stator structure, said mounting means comprising a homogeneous support strip formed of resilient ribbon material, said support strip including a first end piece disposed in a plane transverse to the first axis and secured to the stator structure, a second end piece spaced from the first end piece and radially spaced from the first axis, first and second side pieces disposed on opposite sides of the first axis and integrally secured to the end pieces, said side pieces being bent about a second axis transverse to the first axis, and being spaced in the direction of such second axis, said end pieces and side pieces in developed form constituting substantially a hollow rectangle, a projection extending integrally from the second end piece between and spaced from the side pieces towards the first axis, the free end of said projection terminating in a curved surface arcuate about a third axis transverse to the first axis and spaced in the direction of the first axis from the moving element, said first axis being substantially tangent to the curved surface, and a suspension thread having a first end secured to the moving element and a second end secured to the stator structure, said suspension thread extending along said first axis and over said curved surface in taut condition, said projection having a pair of spaced ribs disposed on opposite sides of said thread, said ribs forming a channel adjacent said curved surface of substantial length for snugly receiving the thread.

3. In an instrument mechanism having a suspension mounting, a stator structure, a moving element, a mounting means mounting said element for rotation about a first axis relative to the stator structure, said mounting means comprising a support strip formed of resilient ribbon material, said support strip including a first end piece disposed in a plane transverse to the first axis and secured to the stator structure, a second end piece spaced from the first end piece and radially spaced from the first axis, first and second side pieces disposed on opposite sides of the first axis and integrally secured to the end pieces, said side pieces being bent about a second axis transverse to the first axis and being spaced in the direction of such second axis, said end pieces and side pieces in developed form constituting substantially a hollow rectangle, a projection extending from the second end piece between and spaced from the side pieces towards the first axis, the free end of said projection terminating in a curved surface arcuate about a third axis transverse to the first axis and spaced in the direction of the first axis from the moving element, said first axis being substantially tangent to the curved surface, said moving element including a hollow tower concentric with said first axis, and a terminal clip secured to said tower within the tower, said clip including a curved section having a second curved surface generated about a fourth axis transverse to the first axis, said first axis being tangent to the second curved surface, said clip having a tail portion spaced from said first axis in a direction substantially transverse to the first axis, and a suspension thread extending in taut condition along the first axis with a first end passing over the first curved surface and secured to the stator structure, said thread having a second end passing through the tower over the second curved surface and secured to the tail portion.

4. In an electrical instrument, a stator structure including means for establishing magnetic flux, a magnetic structure providing paths for magnetic flux produced by said means, said magnetic structure being spaced from said means to define therewith an air gap arcuate about a first axis, a moving-coil having a coil side extending through the air gap in spaced parallel relation with said first axis, and mounting means mounting said coil for rotation about said first axis to move the coil side through the air gap, said mounting means including a support strip formed of resilient, electroconductive non-magnetic material, said strip being bent upon itself to provide a substantially U-shaped configuration having a pair of spaced legs connected by a base, said strip being positioned with said base on one side of said first axis to have said legs spaced in the direction of said first axis on the opposite side of the first axis, said strip being slotted to define a projection of one of said legs which extends from said opposite axis side toward said one axis side, said projection terminating in a curved section having a curved first surface generated about a second axis transverse to the first axis, said first axis being tangent to said first surface, support means carried by said coil spaced in the direction of said first axis by a greater distance from said one leg than from the other leg, said other leg being secured to a portion of said stator structure, and a torsionally resilient electroconductive suspension thread secured to said one leg at said opposite axis side and to said support means to extend through said opening along said first axis in engagement with said curved first surface, said support means including a hollow tower having a recessed circular seat within said hollow concentric with said first axis, and an electroconductive terminal clip including a circular body portion secured to said seat concentric with said first axis, said body portion having an opening with a projection extending from the side wall of said opening towards said first axis, said projection including a curved terminal section having a curved grooved second surface generated about a third axis transverse to said first axis, said first axis being tangent to said second surface, said clip including further a pair of spaced tail portions extending in opposing directions from diametrically opposed points of said body portion, said ribbon being secured to one of said tail portions to extend in engagement with said groove along said first axis, the other of said tail portions being arranged to engageably receive a terminal of the wire forming said coil.

5. In a suspension-type electrical instrument, a stator structure, a moving coil, and suspension mounting means mounting said coil for rotation about a first axis relative to the stator structure, said mounting means including resilient means having a mounting part deflectable in directions parallel to said first axis, support means carried by said coil, and a torsionally resilient electroconductive suspension thread secured to said mounting part and said support means, said support means including a hollow tower having recessed circular seat within said hollow concentric with said first axis, and an electroconductive terminal clip including a circular body portion secured to said seat concentric with said first axis, said body portion having an opening with a projection extending from the side wall of said opening towards said axis, said projection including a curved terminal section having a curved surface generated about a second axis transverse to said first axis, said first axis being substantially tangent to said surface, said terminal section extending substantially wholly on the side of said body portion remotest from said mounting part, said surface including a pair of spaced ribs, said clip including further a pair of spaced tail portions extending in opposing directions substantially transverse to the first axis from diametrically opposed points of said body portion, said thread being secured to one of said tail portions to extend in engagement with said surface between said ribs along said first axis, said ribs forming a channel of substantial length for snugly receiving the thread, the other of said tail portions being arranged to engageably receive conductors of the instrument.

6. In a suspension-type instrument mechanism, a stator structure, a moving element, and mounting means mounting said element for rotation about a first axis relative to the stator structure, said mounting means including a mounting part on said stator structure, support means carried by said element, and a torsionally resilient suspension thread secured to said mounting part and said support means, said support means including a hollow tower having a circular recessed seat within said hollow concentric with said first axis, and a terminal clip including a circular body portion secured to said seat concentric with said first axis, said body portion having an opening with a projection extending from the side wall of said opening towards said first axis, said projection including a curved terminal section having a curved surface generated about a second axis transverse to said first axis, said terminal section extending substantially wholly on the side of said body portion remotest from said mounting part, said first axis being substantially tangent to said surface, said clip including further a tail portion extending from said body portion, said tower having a slot through which said tail portion projects to a location external to said hollow, said thread being secured to one said tail portion externally of said hollow to extend in engagement with said surface along said first axis.

7. In a suspension-type measuring instrument, a stator unit, a rotor unit, and mounting means mounting the rotor unit for rotation about a first axis relative to the stator unit, said mounting means comprising a filamentary element having a length along said axis which may be twisted to permit relative rotation of the ends of the filamentary element about the axis, first securing means securing a first end of the filamentary element to the stator unit and second securing means securing a second end of the filamentary element to the rotor unit, at least one of the securing means comprising a first part secured to one of the units, said first part having a circular recessed seat concentered relative to the axis, and a second part having a circular portion proportioned for snug concentric reception in the seat, said second part having a surface portion arcuate about a second axis transverse to the first axis and adjacent the first axis for guiding the filamentary element smoothly away from the first axis, said surface portion extending substantially wholly on the side of said second part remotest from said first securing means and a separate rib positioned on each side of the surface portion for preventing movement of the filamentary element in directions parallel to the second axis, the circular portion, the surface portion and the ribs being integral parts of a homogeneous body and defining a channel for snugly receiving a substantial length of the filamentary element.

8. In an instrument mechanism having a suspension mounting, a stator structure, a moving element, and mounting means mounting the element for rotation about a first axis relative to the stator structure, said mounting means comprising a homogeneous support ribbon formed of resilient material, said ribbon having a first part disposed in a plane transverse to the first axis, said first part having a first opening within the perimeter of said ribbon through which the axis passes, said ribbon being bent from a first fulcrum about a second axis transverse to the first axis to present a second part, said second part having a second opening within the perimeter of the ribbon through which the first axis passes, said ribbon having a third part extending from a second fulcrum on the free end of the second part towards the first axis, said third part and said second part extending in opposite direction from said second fulcrum and said first fulcrum respectively, said third part having its free end bent to form an arcuate surface to which the first axis is tangent, and a suspension thread, having a first end secured to the moving element, the suspension thread having a portion extending from the moving element along said first axis and over the arcuate surface, said thread having a second end secured to the ribbon and maintaining said arcuate surface deflected from the free position of the arcuate surface towards the moving element.

9. In a suspension-type electrical instrument, a stator structure, a moving coil, and suspension mounting means mounting said coil for rotation about a first axis relative to the stator structure, said mounting means including resilient means having a mounting part deflectable in directions parallel to said first axis, support means carried by said coil, and a torsionally resilient electroconductive suspension thread secured to said mounting part and said support means, said support means including a hollow tower having recessed circular seat within said hollow concentric with said first axis, and an electroconductive terminal clip including a circular body portion secured to said seat concentric with said first axis, said body portion having an opening with spaced edges and with a pin supporting portion extending from a side wall of said opening between said edges and towards said axis, a cylindrical pin provided with a peripheral groove located intermediate its end walls and of an axial length substantially equal to the distance between said spaced edges, said pin supporting portion including a bifurcated curved terminal section having a curved surface generated about a second axis which extends transversely to said first axis and concave in a direction away from said support means, said curved surface locating said pin with said first axis substantially tangent to the bottom wall of said groove and with its said end walls in juxtaposition with said spaced edges, said clip including further a pair of spaced tail portions extending in opposing directions from spaced points of said body portion, said thread being secured to one of said tail portions to extend in engagement with said surface and through said groove along said first axis, the other of said tail portions being arranged to engageably receive a conductor of the instrument.

10. Apparatus for securing a member to a filamentary element of rectangular cross section comprising an assembly having a first part, said first part being provided with a recessed seat of a desired configuration and having a portion concentered relative to the longitudinal axis of said element, said assembly having a second part, said second part having a portion proportional for snug reception in said seat and having an aperture through which said axis extends, said recess being bounded in part by two spaced substantially parallel walls, said walls being on opposite sides of said axis, said second part having a pair of spaced fingers extending into said aperture in straddle arrangement with said axis, a cylindrical centering pin having a peripheral groove with outwardly tapering side walls and a cylindrical bottom wall, the width of said bottom wall being no greater than the width of said filamentary element, said fingers being so arranged as to locate the longitudinal axis of said centering pin normal to said first named axis with said first named axis tangent to said bottom wall, said fingers locating said pin within said aperture and with said pin axis aligned with said parallel walls, said pin being of a length substantially equal to the distance between said parallel walls, said groove being so located along said pin axis that said first named axis lies centrally of the axial dimension of said bottom wall, a portion of said filamentary element extending through said groove closely adjacent said bottom wall and outwardly from said first named axis, and means for securing said filamentary element to said assembly.

References Cited in the file of this patent
UNITED STATES PATENTS

| | | |
|---|---|---|
| 2,633,480 | Staff | Mar. 31, 1953 |
| 2,716,680 | Muzzey | Aug. 30, 1955 |

FOREIGN PATENTS

| | | |
|---|---|---|
| 232,655 | Switzerland | Sept. 1, 1944 |
| 275,489 | Switzerland | Aug. 1, 1951 |
| 752,471 | Great Britain | July 11, 1956 |